United States Patent Office 2,770,151
Patented Nov. 13, 1956

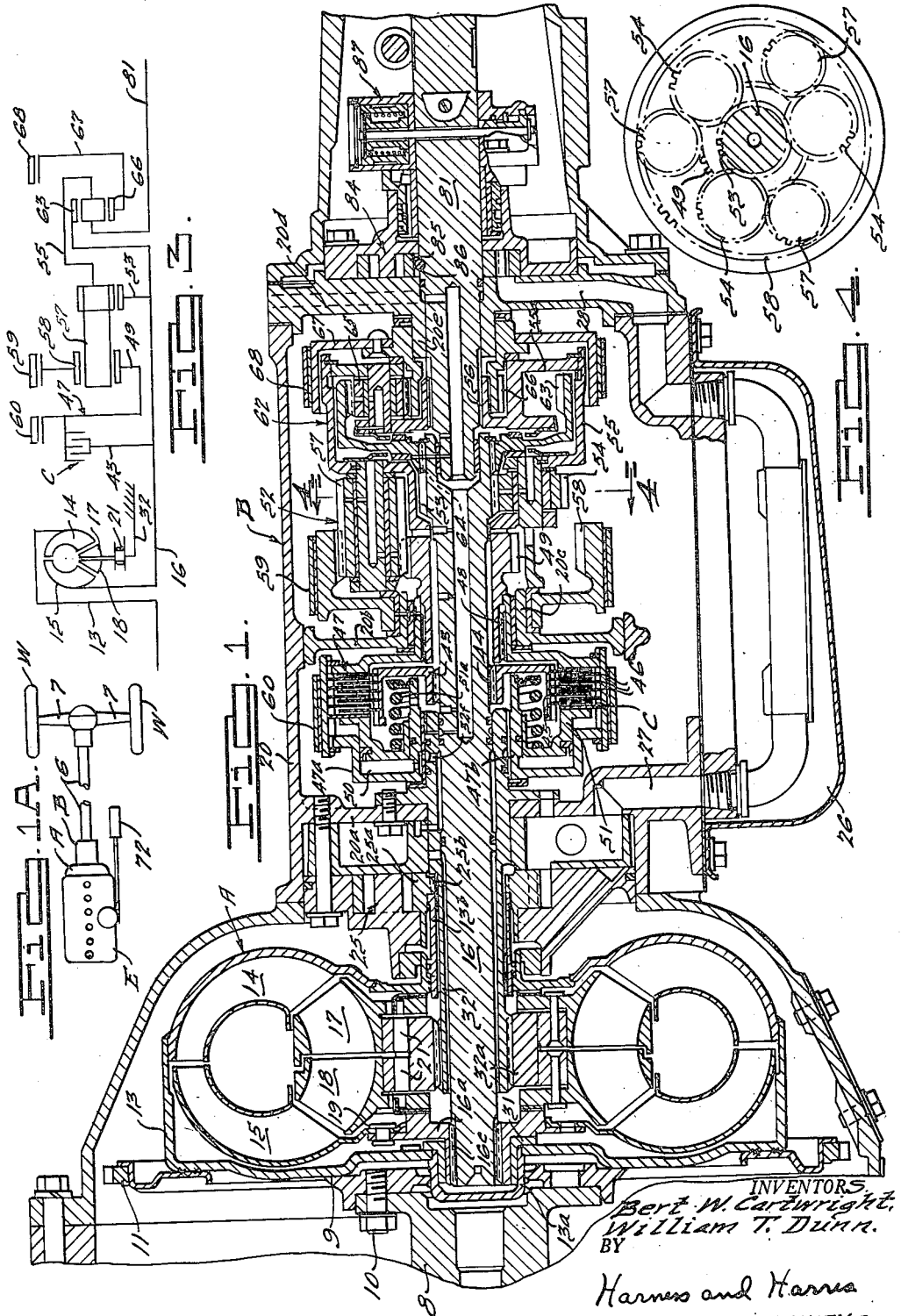

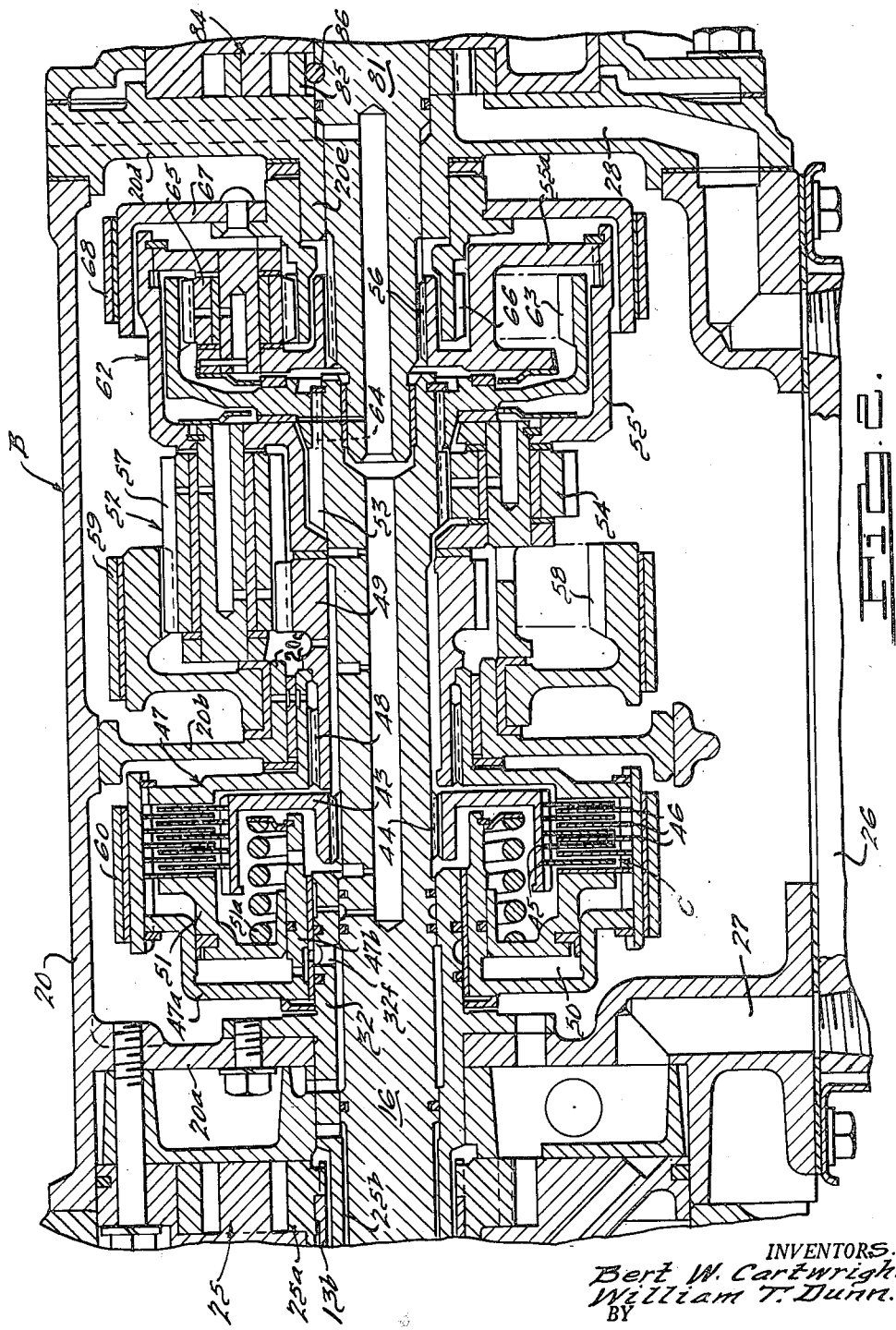

2,770,151

HYDRODYNAMIC TRANSMISSION

Bert W. Cartwright and William T. Dunn, Detroit, Mich., assignors to Chrysler Corporation, Highland Park, Mich., a corporation of Delaware Application June 17, 1952, Serial No. 294,034

15 Claims. (Cl. 74—732)

This invention relates to a power transmission unit that comprises a torque multiplying fluid power transmitting device and a planetary type change speed gear box arranged in series relationship for the transmission of drive. More particularly this invention pertains to the change speed gear box of this drive train and to the control means associated therewith.

It is a primary object of this invention to provide a planetary gear box of a simplified, improved, design that may be readily associated with a hydrodynamic torque converter so as to provide a fully automatic three speed and/or two speed power transmission unit wherein the loads and speeds applied to the several elements of the transmission unit are most favorable as to long, economical transmission life and most conducive to smooth, fast upshifts and downshifts between the several speed ratio drives.

It is another object of this invention to provide a power transmission unit comprising a series arranged hydrodynamic torque converter and a two planetary gear set box wherein only a single clutch is required to provide a three speed power transmission unit.

It is still another object of this invention to provide a three speed power transmission unit utilizing two planetary gear sets and only a single clutch device wherein the clutch device is never required to take full engine torque.

It is still another object of this invention to provide a three speed power transmission unit utilizing a pair of planetary gear sets wherein the shift between a "kicked-down" underdrive and a direct drive involves alternate application of a direct drive clutch and a planetary brake band such that the "kicked-down" underdrive requires activation of only a single epicyclic gear train.

It is still another object of this invention to provide a three speed gear box comprising a pair of planetary gear trains including a single clutch element and a plurality of band elements wherein all clutch and band reactions are taken on stationary casing support members.

It is still another object of this invention to provide a planetary gear box for a two planetary, compounded, gear set that provides the maximum in rigidity and compactness with the minimum in structural complexity.

It is still another object of this invention to provide a two planetary three speed gear box that provides the most desirable gear ratio with the lowest gear speeds and gear loads.

It is a further object of this invention to provide a two planetary, three speed gear box that has only a single clutch and a plurality of brake bands whereby the transmisison control system may be of a simplified form.

Other objects and advantages of this invention will become apparent from a reading of the description below and a consideration of the related drawings wherein:

Fig. 1 is a sectional elevational view of a power transmission unit embodying this invention, the power transmission unit including a hydrokinetic torque converter and a planetary type change speed transmission gear box arranged in series relationship;

Fig. 1a is a diagrammatic plan view of the power transmission unit embodying this invention applied to a motor vehicle drive train;

Fig. 2 is a sectional elevational view of the change speed gear box associated with this power transmission unit;

Fig. 3 is a schematic diagram of this power transmission unit; and

Fig. 4 is a diagrammatic elevational view of the compound gearing, the view being taken along the line 4—4 of Fig. 1.

Fig. 1a diagrammatically discloses a conventional motor vehicle power plant and drive train comprising an internal combustion engine E drivingly connected to a hydrokinetic type of torque converter unit A of the power transmission unit that also includes a change speed gear box B. The output from gear box B drives a propeller or drive shaft 6 that transmits drive to the rear wheels W of the vehicle through the rear driving axles 7.

Fig. 1 of the drawings discloses the power transmission unit per se that comprises a hydrokinetic torque converter unit A and a planetary type change speed gear box B arranged in series drive transmitting relationship. Converter unit A is adapted to drivingly connect a prime mover such as the motor vehicle engine E to the input shaft of transmission gear box B. The reference numeral 8 represents an end portion of a driving member, such as the engine crankshaft of the motor vehicle power unit. The shaft 8 is drivingly connected to the drive transmitting plate 9 by the screw means 10. The drive transmitting plate 9 has an engine starter ring gear 11 mounted on its periphery. Also drivingly connected to the drive plate 9 is the torque converter casing 13 within which are mounted the various converter components, namely, the impeller member 14, the turbine or runner member 15, and the primary and secondary guide wheels or reaction members 17 and 18 respectively.

The vaned impeller wheel 14 is fixedly connected to the converter casing 13 and is accordingly adapted to be rotatably driven by the driving shaft 8. The vaned turbine wheel 15 is drivingly connected by rivet means 19 to a radially extending flange portion formed on the hub member 16a of the converter driven shaft 16. Hub member 16a is connected by splines 16c or the like to the forward end portion of the driven intermediate shaft member 16.

The intermediate shaft member 16 is adapted to transmit drive from the torque converter unit A to the gear box B arranged rearwardly of and in series with the torque converter unit A. The forward end of intermediate shaft 16 is piloted in a bearing assembly 31 that is mounted in an axially extending seat 13a formed in the front end of the converter casing 13. The rear end portion of intermediate shaft 16 is rotatably supported by a sleeve-like bearing element 32 that is mounted on the wall 20a of the casing 20 of the transmission gear box B.

The vaned guide wheels 17 and 18 of the converter are rotatably supported within the converter casing 13 by means of the one-way brake devices 21. The one-way brake devices 21 are mounted on the axially extending sleeve 32 that is fixed to and projects from the rearwardly positioned, relatively stationary, gear box casing wall 20a. Sleeve 32 has a hub member 32a spined thereto which hub member supports the overrunning or one-way brake device 21. The one-way brakes 21 are designed and arranged such that they will permit only forward rotary movement (clockwise when looking from the converter A towards gear box B of Fig. 1) to be transmitted to guide wheels 17 and 18 by the forward or clockwise rotation of the impeller 14. The brakes 21 lock against the sleeve hubs 32a to prevent rotation of the guide wheels 17 and 18 in a reverse or counterclockwise direction.

The torque converter unit A includes a gear type oil pump 25 having a driven gear 25a that is directly connected by key and slot means 25b to the axially extending flange portion 13b of the rotatable converter casing 13. The pump 25 draws oil from a sump 26 through the conduit 27 and circulates it through the converter unit. A, portions of the transmission lubricating system, and the various hydraulically operated control mechanisms associated with this transmission unit. The circulation of oil through the converter A, by the pump 25, provides a means for maintaining the converter full of oil whenever shaft 8 is rotating. A second oil pump 84 driven by the transmission output shaft 81 is also included in this power transmission unit to provide a source of pressure fluid when the engine E is not operating. The pump 84 and its operation will be hereinafter more fully described.

The gear box B includes a friction disc clutch C that comprises the drum-like annular member 43 which is splined at 44 to the intermediate driven shaft 16. Driven shaft 16 constitutes the input member of clutch C. Mounted on the peripheral portion of the annular member 43 are friction disc clutch elements 45. Clutch elements 45 are adapted to be engaged with cooperating clutch elements 46 carried by the encircling drum-shaped member 47. Drum-shaped member 47 is drivingly connected at 48 to the sun gear 49 of the change speed gear box B. Drum member 47 has wall portions 47a and 47b that journal the member 47 on the casing mounted bearing sleeve 32. The walls of drum member 47 are also formed to provide a piston receiving bore 50. Engagement of clutch discs 45 and 46 is effected by the admission of pressure fluid to the cylinder bore 50 in the drum member 47. Pressure fluid admitted to cylinder bore 50 moves the reciprocably mounted piston 51 rearwardly to cause engagement of clutch discs 45 and 46. Compression spring 51a normally urges piston 51 towards a forward, disengaged clutch position. Passage 32f in sleeve 32 provides a means for supplying pressure fluid to the cylinder bore 50.

The compounded planetary gearing that is disposed between the clutch C and the output shaft 81 comprises a first set of gearing 52 that includes the sun gear 53 which is formed on the intermediate drive shaft 16. Sun gear 53 meshingly engages with the short pinion gear members 54 that are rotatably mounted on the carrier element 55. Carrier element 55 is drivingly connected by splines 56 to the output shaft 81. The carrier element 55 also rotatably journals a second set of relatively long pinion gears 57 which long pinion gears are meshingly engaged with the relatively short pinion gears 54. The long pinion gears 57 have portions thereof surrounded by and meshingly engaged with the annulus gear 58. Annulus gear 58 is journaled on the axially projecting neck 20c of the gear box housing partition wall 20b. Partition wall 20b provides a rigid support for the gearing that is located intermediate the housing end walls 20a and 20d and thus shaft deflection and gear tipping is reduced to a minimum. A brake band 59 encircles the outer peripheral flange of annulus gear 58 and is adapted to be applied thereto in order to activate certain of the gearing 53—58 as will be explained subsequently.

The sun gear 49 that is formed as a part of the clutch drum member 47 is also arranged to meshingly engage portions of the long pinion gears 57. A brake band 60 encircles the outer peripheral flange of the drum member 47 and is adapted to be applied thereto to anchor the sun gear 49 against rotation. Anchoring sun gear 49 against rotation will activate certain of the planetary gearing as will be described subsequently.

Arranged rearwardly of the planetary gearing 53—58 is a second set of planetary gearing that is designated generally by the numeral 62. The gear set 62 comprises the annulus gear element 63 that is drivingly connected by splineways 64 to the intermediate drive shaft 16. Annulus gear 63 meshingly engages with pinion gears 65 that are rotatably mounted on the wall 55a of the pinion gear carrier 55. As previously mentioned carrier 55 is drivingly connected to the output shaft 81 and it will thus be seen that the carrier member 55 provides the output member for each of the sets of planetary gearing 52, 62 in addition to supporting the pinion gears of each of the sets of gearing 52, 62. A sun gear 66 is carried by a drum member 67 and is arranged in meshing engagement with pinion gears 65 of the gear set 62. Drum member 67 is journaled on an axially extending neck 20e that projects from the casing end wall 20d. The outer peripheral flange of the drum member 67 is encircled by a brake band 68 that is adapted to be applied to the outer flange of drum member 67 to anchor same against rotation.

On the rear side of the casing wall 20d is mounted the second oil pump 84. Oil pump 84 is similar to oil pump 25 and includes a driving gear element 85 that is drivingly connected by pin means 86 to the transmission output shaft 81. Oil is withdrawn by pump 84 from the transmission case oil sump 26 through the conduit 28. Pressurized oil is distributed by the pump 84 to the supply for the converter A and to the hydraulic control system for the transmission as well as to the pressurized transmission lubrication system.

The hydraulic control system associated with the herein described transmission unit can be of the combination vehicle speed and engine torque controlled type shown in the co-pending application of William L. Sheppard, Serial No. 98,493, filed June 11, 1949. The vehicle speed responsive governor mechanism 87, shown mounted on the output shaft 81 of the herein described transmission, is identical to that described and claimed in the aforementioned William L. Sheppard application Serial No. 98,493.

It is proposed to provide suitable hydraulic controls to provide either a fully automatic three speed gear box or a fully automatic two speed gear box in addition to providing means for locking the transmission in either of the two underdrive ratios and reverse drive. However, as the invention herein described and claimed does not relate to controls but the gear box per se, it is not thought that a detailed description of the control system is required. Suffice it to say that with the torque converter A having a torque multiplying stall ratio of 2.2 and with a rear wheel driving axle ratio of 3.54 then the table set forth below gives the pertinent information relative to the driving ratios obtainable with a transmission of this type.

| 2.2 Torque Converter | | 3.54 Axle Ratio | |
|---|---|---|---|
| Drive Ratio | Control Applied | Gear Ratio | Overall Ratio |
| Low (1st) | Band 60 | 2.55 | 19.8–9.03 |
| Kickdown (2nd) | Band 68 | 1.45 | 5.13 |
| Direct (3rd) | Clutch C | 1.00 | 3.54 |
| Reverse | Band 59 | 2.25 | 7.96 |

From a consideration of the aforegoing description and the related drawings, it is thought to be clear that this transmission provides a compact, rigid, relatively simple gear box that can be combined with a hydrodynamic torque converter device to provide a fully automatic two or three speed gear box that will give the required ratios and flexibility in order to efficiently operate in current traffic and on current highways. When a two speed box is desired, the controls are set to apply the kickdown band 68 to annulus 67 and thereby activate gear set 62. This gives an excellent normal starting drive ratio of 11.28 to 1 and after the vehicle speed has reached a predetermined value, under a prescribed throttle valve opening, then the control system would automatically effect substantially simultaneous release of brake band 68 and engagement of clutch C. Engaging clutch C locks up the gear set 52 and transmits a direct drive intermediate shaft 16 to output shaft 81 at substantially a 1:1 overall ratio neglecting slip losses in the converter A. For immediate acceleration when traveling in direct drive the accelerator 72 may be depressed sufficiently to cause the control system to kickdown the drive ratio from the cruising direct drive to the initial starting drive by causing a release of clutch C and a reengagement of band 68 and annulus 67. When operating in the "kickdown" or 2nd speed ratio, the torque multiplying effect of both the gear set 62 and the hydraulic converter A are then available under certain conditions.

If a starting drive with increased torque over the normal 2nd speed or "kickdown" drive is desired then the controls are set to initially start in "low" or 1st speed by applying the band 60 to the drum 47 so as to activate the gearing 52 which combined with the torque converter A gives a starting drive overall ratio of as much as 19.8 to 1. The control system can then automatically release band 60 and apply band 68 to sun gear drum member 67 to upshift from the "low" or 1st speed to the 2nd or "kickdown" speed ratio drive. Thereafter when speed and torque conditions are satisfactory the control system will again automatically upshift from the 2nd or "kickdown" ratio to the 3rd or "direct" speed ratio. A downshift may be automatically or driver accomplished from the "direct" drive to both the "kickdown" and the "low" ratios. The control system will also include means to lock the controls in either of the "low" or "kickdown" ratios so that these ratios may be used for coast braking or the like.

Reverse drive is accomplished by applying band 59 to annulus 58 to activate gear set 52 for the transmission of a reverse drive to the carrier 55 and the associated output shaft 81.

It will be noted that the transmission disclosed utilizes only a single clutch C and three planetary brake bands 59, 60, 68. Furthermore, the most frequent shift, namely that between direct drive and "kickdown" or 2nd speed, involves the alternate application and release of the clutch C and band 68. Such a shift is considered to be much preferred over a clutch to clutch shift due to the smaller quantities of pressure fluid that need to be transferred during the shift period. In addition it will be noted that during use of the "kickdown" ratio only the single three element epicylic gear train 62 is activated and the loads on the elements of this gear set are relatively low. Furthermore, due to the arrangement of this gear set 62 in the gear box B, it is possible to make changes in the gears of this set without effecting the gear set 52. This is of considerable importance for it adds flexibility to this gear box such that it can be used in many different drive trains.

Another advantageous feature of this transmission gear box is the design whereby each band and clutch reaction member is journaled on a stationary rigid casing element such that deflection loads will not be applied to the drive transmitting elements of the transmission unit.

We claim:

1. A power transmission unit comprising a hydrodynamic torque converter including impeller, turbine and reaction members, and a multi-speed planetary gear box including first and second planetary gear sets and an output shaft, said gear sets each being arranged in series between said converter and said output shaft, said gear box comprising an intermediate shaft connected to the converter turbine member and adapted to transmit drive between the turbine member and the several gear sets, said intermediate shaft mounting a first sun gear of said first gear set and a first annulus gear of said second gear set, a second sun gear for said first gear set, a clutch device connectible between said intermediate shaft and said second sun gear of said first gear set, a first brake means to selectively anchor said second sun gear of said first gear set against rotation, a first set of pinion gearing meshingly engaged with the first and second sun gears of said first gear set, a carrier rotatably supporting said first set of pinion gearing and drivingly connected to said output shaft, a second annulus gear meshingly engaged with the pinion gearing of the first gear set, a second brake means adapted to be applied to said second annulus gear to selectively anchor said second annulus gear against rotation, a second set of pinion gearing rotatably supported by said carrier member and arranged in meshing engagement with the said first annulus gear of the second set of gearing, a third sun gear meshingly engaged with the said second set of pinion gearing, and a third brake means engageable with said third sun gear to selectively anchor said third sun gear against rotation.

2. A power transmission unit comprising a hydrodynamic torque converter including impeller, turbine and reaction members, and a multi-speed planetary gear box including a casing, first and second planetary gear sets and an output shaft, said gear sets each being arranged in said casing and connectible in series between said converter and said output shaft, said gear box comprising an intermediate shaft journaled in said casing and connected to the converter turbine member and adapted to transmit drive between the turbine member and the several gear sets, said intermediate shaft mounting a first sun gear of said first gear set and a first annulus gear of said second gear set, a second sun gear for said first gear set journaled in said casing, a clutch device connectible between said intermediate shaft and said second sun gear of said first gear set, a first brake means to selectively anchor said second sun gear of said first gear set against rotation, a first set of pinion gearing meshingly engaged with the first and second sun gears of said first gear set, a carrier rotatably supporting said first set of pinion gearing and drivingly connected to said output shaft, a second annulus gear journaled in said casing and meshingly engaged with the pinion gearing of the first gear set, a second brake means adapted to be applied to said second annulus gear to selectively anchor said second annulus gear against rotation, a second set of pinion gearing rotatably supported by said carrier member and arranged in meshing engagement with the said first annulus gear of the second set of gearing, a third sun gear journaled in said casing and meshingly engaged with the said second set of pinion gearing, and a third brake means engageable with said third sun gear to selectively anchor said third sun gear against rotation.

3. A power transmission unit comprising a multi-speed planetary gear box including an input shaft, first and second planetary gear sets and an output shaft, said input shaft mounting a first sun gear of said first gear set and a first annulus gear of said second gear set, a second sun gear for said first gear set, a clutch device connectible between said input shaft and said second sun gear of said first gear set, a first brake means to selectively anchor said second sun gear of said first gear set against rotation, a first set of pinion gearing meshingly engaged with the first and second sun gears of said first gear set, a carrier rotatably supporting said first set of pinion gearing and drivingly connected to said output shaft, a second annulus gear meshingly engaged with the pinion gearing of the first gear set, a second brake means adapted to be applied to said second annulus gear to selectively anchor said second annulus gear against rotation, a second set of pinion gearing rotatably supported by said carrier member and arranged in meshing engagement with the said first annulus gear of the second set of gearing, a third sun gear meshingly engaged with the said second set of pinion gearing, and a third brake means engageable with said third sun gear to selectively anchor said third sun gear against rotation.

4. A power transmission unit comprising a multi-speed planetary gear box including a casing, an input shaft, first and second planetary gear sets and an output shaft, said input shaft being journaled in said casing and mounting a first sun gear of said first gear set and a first annulus gear of said second gear set, a second sun gear for said first gear set journaled in said casing, a clutch device connectible between said input shaft and said second sun gear of said first gear set, a first brake means to selectively anchor said second sun gear of said first gear set against rotation, a first set of pinion gearing meshingly engaged with the first and second sun gears of said first gear set, a carrier rotatably supporting said first set of pinion gearing and drivingly connected to said output shaft, a second annulus gear journaled in said casing and meshingly engaged with the pinion gearing of the first gear set, a second brake means adapted to be applied to said second annulus gear to selectively anchor said second annulus gear against rotation, a second set of pinion gearing rotatably supported by said carrier member and arranged in meshing engagement with the said first annulus gear of the second set of gearing, a third sun gear journaled in said casing and meshingly engaged with the said second set of pinion gearing, and a third brake means engageable with said third sun gear to selectively anchor said third sun gear against rotation.

5. A power transmission unit comprising a hydrodynamic torque converter including impeller, turbine and reaction members, and a multi-speed planetary gear box including a casing that mounts within it first and second planetary gear sets and an output shaft, said gear sets each being arranged in series between said converter and said output shaft, said gear box including an intermediate shaft extending longitudinally of and journaled in said casing and drivingly connected to the converter turbine member and adapted to transmit drive between the turbine member and the several gear sets, said intermediate shaft mounting a first sun gear of said first gear set and a first annulus gear of said second gear set, a casing wall extending transversely of the casing intermediate the ends thereof, a drum member having portions thereof journaled in said casing wall, a second sun gear for said first gear set drivingly connected to portions of said drum member located on one side of said casing wall, a clutch device carried by said drum member and arranged on the other side of said casing wall, said clutch device being adapted to selectively connect said intermediate shaft and said second sun gear of said first gear set, a first brake means located on said other side of said casing wall and engageable with said drum member to selectively anchor said second sun gear of said first gear set against rotation, a first set of pinion gearing located on said one side of said casing wall and meshingly engaged with the first and second sun gears of said first gear set, a carrier rotatably supporting said first set of pinion gearing located on the one side of said casing wall and drivingly connected to said output shaft, a second annulus gear journaled in said casing wall and meshingly engaged with the pinion gearing of the first gear set, a second brake means located on said one side of said wall adapted to be applied to said second annulus gear to selectively anchor said second annulus gear against rotation, a second set of pinion gearing rotatably supported by said carrier member and arranged in meshing engagement with the said first annulus gear of the second set of gearing, a third sun gear journaled in said casing meshingly engaged with the said second set of pinion gearing, and a third brake means located on said one side of said casing wall and engageable with said third sun gear to selectively anchor said third sun gear against rotation.

6. A power transmission unit comprising a hydrodynamic torque converter including impeller, turbine and reaction members, and a multi-speed planetary gear box including first and second planetary gear sets and an output shaft, said gear sets each being arranged in series between said converter and said output shaft, said gear box comprising an intermediate shaft connected to the converter turbine member and adapted to transmit drive between the turbine member and the several gear sets, said intermediate shaft mounting a first sun gear of said first gear set and a first annulus gear of said second gear set, a second sun gear for said first gear set, a clutch device connectible between said intermediate shaft and said second sun gear of said first gear set to provide means for the transmission of direct drive between said shafts, a first brake means to selectively anchor said second sun gear of said first gear set against rotation to provide means for the transmission of a first relatively low speed underdrive between said shafts, a first set of pinion gearing meshingly engaged with the first and second sun gears of said first gear set, a carrier rotatably supporting said first set of pinion gearing drivingly connected to said output shaft, a second annulus gear meshingly engaged with the pinion gearing of the first gear set, a second brake means adapted to be applied to said second annulus gear to selectively anchor said second annulus gear against rotation to provide means for the transmission of a reverse drive between said shafts, a second set of pinion gearing rotatably supported by said carrier member and arranged in meshing engagement with the said first annulus gear of the second set of gearing, a third sun gear meshingly engaged with the said second set of pinion gearing, and a third brake means engageable with said third sun gear to selectively anchor said third sun gear against rotation and provide means for the transmission of a second relatively high speed underdrive between said shafts.

7. A power transmission unit comprising a hydrodynamic torque converter including impeller, turbine and reaction members, and a multi-speed planetary gear box including first and the second planetary gear sets and an output shaft, said gear box comprising an intermediate shaft connected to the converter turbine member and adapted to transmit drive between the turbine member and the several gear sets, said intermediate shaft mounting a first input gear of said first gear set and a first input gear of said second gear set, a first reaction gear for said first gear set, a clutch device connectible between said intermediate shaft and said first reaction gear of said first gear set, a first brake means to selectively anchor said first reaction gear of said first gear set against rotation, a first set of compounded pinion gearing meshingly engaged with the first reaction and input gears of said first gear set, a carrier rotatably supporting said first set of pinion gearing and drivingly connected to said output shaft, a second reaction gear meshingly engaged with the pinion gearing of the first gear set, a second brake means adapted to be applied to said second reaction gear to selectively anchor said second reaction gear against rotation, a second set of pinion gearing carried by said carrier member and arranged in meshing engagement with the said first input gear of the second set of gearing, a third reaction gear meshingly engaged with the said second set of pinion gearing, and a third brake means engageable with said third reaction gear to selectively anchor said third reaction gear against rotation.

8. A power transmission unit comprising a mutli-speed planetary gear box including an input shaft, first and second planetary gear sets and an output shaft, said input shaft mounting a first input gear of said first gear set and a first input gear of said second gear set, a first reaction gear for said first gear set, a clutch device connectible between said input shaft and said first reaction gear of said first gear set, a first brake means to selectively anchor said first reaction gear of said first gear set against rotation, a first set of compounded pinion gearing meshingly engaged with the first reaction and input gears of said first gear set, a carrier rotatably supporting said first set of pinion gearing and drivingly connected to said output shaft, a second reaction gear meshingly engaged with the pinion gearing of the first gear set, a second brake means adapted to be applied to said second reaction gear to selectively anchor said second reaction gear against rotation, a second set of pinion gearing carried by said carrier member and arranged in meshing engagement with the said first input gear of the second set of gearing, a third reaction gear meshingly engaged with the said second set of pinion gearing, and a third brake means engageable with said third reaction gear to selectively anchor said third reaction gear against rotation.

9. A power transmission unit comprising a hydrodynamic torque converter including impeller, turbine and reaction members, and a multi-speed planetary gear box including a casing that supports first and second planetary gear sets and an output shaft, said gear box comprising an intermediate shaft drivingly connected to the converter turbine member and adapted to transmit drive between the turbine member and the several gear sets, said intermediate shaft mounting a first sun gear of said first gear set and a first annulus gear of said second gear set, a second sun gear for said first gear set, a clutch device connectible between said intermediate shaft and said second sun gear of said first gear set, a first brake means to selectively anchor said second sun gear of said first gear set against rotation, a carrier member drivingly connected to said output shaft, a first set of pinion gearing rotatably supported by said carrier member and arranged to form part of said first planetary gear set, said first set of pinion gearing meshingly engaging with said second sun gear of said first gear set, a second annulus gear meshingly engaged with the said first set of pinion gearing of the first gear set, a second brake means adapted to be selectively applied to said second annulus gear to anchor same against rotation, a second set of pinion gearing for the first gear set rotatably supported by the carrier member and meshingly engaged between the first sun gear of the first gear set and the first set of pinion gearing of the first gear set, a third set of pinion gearing rotatably mounted on the carrier member, said third set of pinion gearing forming part of the second gear set and meshingly engaging the said first annulus gear of the second gear set, a third sun gear meshingly engaging said third set of pinion gearing, and a third brake means adapted to be selectively applied to said third sun gear to anchor same against rotation.

10. A power transmission unit comprising a hydrodynamic torque converter including impeller, turbine and reaction members, and a multi-speed planetary gear box including a casing that supports first and second planetary gear sets and an output shaft, said gear sets each being arranged for connection in series between said converter and said output shaft, said gear box comprising an intermediate shaft drivingly connecter to the converter turbine member and adapted to transmit drive between the turbine member and the several gear sets, said intermediate shaft mounting a first sun gear of said first gear set and a first annulus gear of said second gear set, a second sun gear for said first gear set journaled in said casing, a clutch device connectible between said intermediate shaft and said second sun gear of said first gear set, a first brake means to selectively anchor said second sun gear of said first gear set against rotation, a carrier member drivingly connected to said output shaft, a first set of pinion gearing rotatably supported by said carrier member and arranged to form part of said first planetary gear set, said first set of pinion gearing meshingly engaging with said second sun gear of said first gear set, a second annulus gear journaled in said casing and meshingly engaged with the said first set of pinion gearing of the first gear set, a second brake means adapted to be selectively applied to said second annulus gear to anchor same against rotation, a second set of pinion gearing for the first gear set rotatably supported by the carrier member and meshingly engaged between the first sun gear of the first gear set and the first set of pinion gearing of the first gear set, a third set of pinion gearing rotatably mounted on the carrier member, said third set of pinion gearing forming part of the second gear set and meshingly engaging the said first annulus gear of the second gear set, a third sun gear journaled on said casing and meshingly engaging said third set of pinion gearing, and a third brake means adapted to be selectively applied to said third sun gear to anchor same against rotation.

11. A power transmission unit comprising a multi-speed planetary gear box including a casing that supports an input shaft, first and second planetary gear sets and an output shaft, said input shaft mounting a first sun gear of said first gear set and a first annulus gear of said second gear set, a second sun gear for said first gear set, a clutch device connectible between said intermediate shaft and said second sun gear of said first gear set, a first brake means to selectively anchor said second sun gear of said first gear set against rotation, a carrier member drivingly connected to said output shaft, a first set of pinion gearing rotatably supported by said carrier member and arranged to form part of said first planetary gear set, said first set of pinion gearing meshingly engaging with said second sun gear of said first gear set, a second annulus gear meshingly engaged with the said first set of pinion gearing of the first gear set, a second brake means adapted to be selectively applied to said second annulus gear to anchor same against rotation, a second set of pinion gearing for the first gear set rotatably supported by the carrier member and meshingly engaged between the first sun gear of the first gear set and the first set of pinion gearing of the first gear set, a third set of pinion gearing rotatably mounted on the carrier member, said third set of pinion gearing forming part of the second gear set and meshingly engaging the said first annulus gear of the second gear set, a third sun gear meshingly engaging said third set of pinion gearing, and a third brake means adapted to be selectively applied to said third sun gear to anchor same against rotation.

12. A power transmission unit comprising a multi-speed planetary gear box including an input shaft, first and second planetary gear sets and an output shaft, said input shaft mounting a first input gear of said first gear set and a first input gear of second gear set, a first reaction gear for said first gear set, a clutch device connectible between said input shaft and said first reaction gear of said first gear set, a first brake means to selectively anchor said first reaction gear of said first gear set against rotation, a carrier member drivingly connected to said output shaft, a first set of pinion gearing rotatably supported by said carrier member and arranged to form part of said first planetary gear set, said first set of pinion gearing meshingly engaging with said first reaction gear of said first gear set, a second reaction gear meshingly engaged with the said first set of pinion gearing of the first gear set, a second brake means adapted to be selectively applied to said second reaction gear to anchor same against rotation, a second set of pinion gearing for the first gear set rotatably supported by the carrier member and meshingly engaged between the first input gear of the first gear set and the first set of pinion gearing of the first gear set, a third set of pinion gearing rotatably mounted on the carrier member, said third set of pinion gearing forming part of the second gear set and meshingly engaging the said first input gear of the second gear set, a third reaction gear meshingly engaging said third set of pinion gearing, and a third brake means adapted to be selectively applied to said third reaction gear to anchor same against rotation.

13. A motor vehicle power transmission unit comprising an engine driven hydrodynamic torque converter including impeller, turbine and reaction members, and a multi-speed planetary gear box including a casing that supports first and second planetary gear sets and an output shaft, said gear sets each being arranged for connection in series between said converter and said output shaft, said gear box comprising an intermediate shaft drivingly connected to the converter turbine member and extending partially through said casing lengthwise thereof, said intermediate shaft being adapted to transmit drive between the turbine member and the several gear sets, said intermediate shaft mounting a first sun gear of said first gear set and a first annulus gear of said second gear set, a casing wall intermediate the ends thereof journaling said intermediate shaft, a second sun gear for said first gear set journaled in said casing wall, a clutch device mounted on said second sun gear and located on one side of said wall, said clutch device being connectible between said intermediate shaft and said second sun gear of said first gear set, a first brake means located on said one side of said casing wall to selectively anchor said second sun gear of said first gear set against rotation, a carrier member located on the other side of said wall and drivingly connected to said output shaft, a first set of pinion gearing rotatably supported by said carrier member on said other side of the casing wall and arranged to form part of said first planetary gear set, said first set of pinion gearing meshingly engaging with said second sun gear of said first gear set, a second annulus gear journaled in said casing wall and meshingly engaged with the said first set of pinion gearing of the first gear set, a second brake means adapted to be selectively applied to said second annulus gear to anchor same against rotation, a second set of pinion gearing for the first gear set rotatably supported by the carrier member on said other side of the casing wall and meshingly engaged between the first sun gear of the first gear set and the first set of pinion gearing of the first gear set, a third set of pinion gearing rotatably mounted on the carrier member on said other side of the casing wall, said third set of pinion gearing forming part of the second gear set and meshingly engaging the said first annulus gear of the second gear set, a third sun gear journaled on said casing on the said other side of the casing wall and meshingly engaging said third set of pinion gearing, and a third brake means adapted to be selectively applied to said third sun gear to anchor same against rotation.

14. A three speed transmission unit comprising a hydrodynamic torque transmitter including impeller and turbine members and a planetary gear box arranged in series with said transmitter, said gear box comprising an input shaft drivingly connected to said turbine member and an output shaft, a pair of axially spaced planetary drive input gear elements mounted on said input shaft, a first compounded pinion planetary gear set connected between one of the drive input gear elements on said input shaft and said output shaft, said compounded pinion planetary gear set comprising a pair of separate sets of pinion gearing with one of said sets of pinion gearing having a pair of reaction gears meshingly engaged therewith, friction bands for selectively anchoring each of said pair of reaction gears, said pair of band controlled reaction gears providing means for selectively transmitting a first forward underdrive and a reverse drive between said shafts, a second planetary gear set connected between the other of the drive input gear elements on said input shaft and said output shaft including a third reaction gear and a friction band anchor therefor arranged so as to provide means for selectively transmitting a second forward underdrive between said shafts, and a clutch device selectively engageable between said input shaft and one of the reaction gears of said first planetary gear set to provide means for transmitting a forward direct drive between said shafts.

15. A three speed transmission gear box comprising an input shaft and an output shaft, a pair of axially spaced planetary drive input gear elements mounted on said input shaft, a first compounded pinion planetary gear set connected between one of the drive input gear elements on said input shaft and said output shaft, said compounded pinion planetary gear set comprising a pair of separate sets of pinion gearing with one of said sets of pinion gearing having a pair of reaction gears meshingly engaged therewith, a pair of anchor means for said reaction gears providing means for selectively actuating said first gear set for transmitting a first forward underdrive and a reverse drive between said shafts, a second planetary gear set connected between the other of the drive input gear elements on said input shaft and said output shaft including a third reaction gear and anchor means therefor arranged so as to provide means for selectively transmitting a second forward underdrive between said shafts, and a clutch device selectively engageable between said input shaft and one of the reaction gears of said first planetary gear set to provide means for transmitting a forward direct drive between said shafts.

References Cited in the file of this patent

UNITED STATES PATENTS

| 1,546,287 | Koerber | July 14, 1925 |
| 2,190,831 | Dodge | Feb. 20, 1940 |
| 2,514,963 | McRae | July 11, 1950 |
| 2,591,342 | Dodge | Apr. 1, 1952 |
| 2,606,459 | Carnegie | Aug. 12, 1952 |
| 2,609,706 | Jandasek | Sept. 9, 1952 |
| 2,629,265 | Dodge | Feb. 24, 1953 |
| 2,667,085 | Ackerman | Jan. 26, 1954 |

FOREIGN PATENTS

| 966,238 | France | May 18, 1948 |
| 974,256 | France | Sept. 27, 1950 |